United States Patent [19]

Blessum

[11] Patent Number: 4,688,119
[45] Date of Patent: Aug. 18, 1987

[54] DETECTION AND AMPLIFICATION CIRCUIT

[75] Inventor: Norman S. Blessum, Thousand Oaks, Calif.

[73] Assignee: Xebec Development Partners, Ltd., San Jose, Calif.

[21] Appl. No.: 800,063

[22] Filed: Nov. 20, 1985

[51] Int. Cl.⁴ .............................................. G11B 5/56
[52] U.S. Cl. ...................................................... 360/77
[58] Field of Search ................................... 360/77, 78

[56] References Cited

U.S. PATENT DOCUMENTS

| 4,087,843 | 5/1978 | Louis et al. | 360/77 |
| 4,130,844 | 12/1978 | Klinger | 360/77 |
| 4,297,734 | 10/1981 | Laishley et al. | 360/77 |
| 4,380,034 | 4/1983 | Krake | 360/77 |
| 4,462,053 | 7/1984 | Lum et al. | 360/77 |
| 4,498,129 | 2/1985 | Velazquez | 364/174 |
| 4,511,938 | 4/1985 | Betts | 360/77 |

OTHER PUBLICATIONS

IBM Technical Disclosure Bulletin, vol. 20, No. 5, Oct. 1977, pp. 1789–1791, Rotating Record Disk Initialization For Sector Servoing, Dennison et al.

Primary Examiner—George G. Stellar
Attorney, Agent, or Firm—Spensley, Horn, Jubas & Lubitz

[57] ABSTRACT

A disk drive control system including servo sectors written on a disk, with each sector containing three sets of marker pulses arranged so that three adjacent marker pulses from each of the sets spans two tracks. The pulses each comprise high frequency sinusoidal signals. Servo control depends upon the pulse amplitudes sensed by the read/write head while traversing a servo sector. The system includes an amplifier to rectify and amplify the high frequency signals, a sample-and-hold circuit to hold at least three value representative of the amplified high frequency signals, and synchronizing means to synchronize the sample-and-hold circuit such that the first value sampled and held is representative of the amplitude of the first pulse read in a servo sector, the second value sampled and held is representative of the amplitude of the second pulse read in the servo sector, and so forth. A multiplexing circuit provides multiplexed signals sequentially representative of values sampled.

24 Claims, 8 Drawing Figures

DETECTION AND AMPLIFICATION CIRCUIT

BACKGROUND OF THE INVENTION

1. Field of the Invention

The present invention relates to a control system for a magnetic disk drive system and, more particularly, to circuitry for use with a servo system to control movement of a read/write transducer associated with a magnetic disk drive system.

2. Description of the Prior Art

In the field of electronic data handling, it is conventional to store data in binary form on the face of a rotatable disk. In operation, such a disk is rotated by a so-called spindle motor and the binary data is encoded upon, or retrieved from, the face of the disk by a movable electromagnetic transducer device often referred to as a read/write head. More particularly, the binary information is magnetically encoded on the face of the disk in concentric rings, called tracks, and the read/write transducer is selectively positioned by a pivoted read/write arm to move across the face of the disk in order to locate a particular track at which information is to be recorded or retrieved. Once a desired track is located, rotation of the magnetic disk will bring the read/write transducer to a particular location on the track, called a sector location, at which the read or write operation will be accomplished. A typical five and one-quarter inch diameter disk, for example, has four hundred to six hundred tracks for data storage and thirty-two sectors per track.

In many magnetic recording disk systems, the read/write transducer is driven to seek a desired track on the disk by means of a motor and an associated mechanism which translate electrical commands from a controller for the disk drive system to discrete steps of the read/write transducer arm across the face of the magnetic recording disk. In such systems, to accurately locate the read/write transducer at a particular location on a desired track on a magnetic disk, it is necessary that the controller receive orientation information. As one source of such information, it is typical to magnetically write orientation information upon the face of the magnetic disk so that, by reading such information, the read/write transducer is able to determine its location upon the disk. A drawback of such an approach, however, is that the space taken up on the face of the disk for the orientation information could be otherwise utilized for data storage. Accordingly, if orientation information is written upon the face of a magnetic disk, it is desirable to keep such information brief, i.e., to minimize the physical space needed to store such orientation information.

SUMMARY OF THE INVENTION

A primary object of the present invention is to provide amplification and detection circuitry for use in a servo system to control the movement of a read/write transducer in a magnetic disk drive system.

More particularly, an object of the present invention is to provide amplification and detection circuitry for use on a servo system to control the positioning movement of a read/write transducer in a magnetic disk drive system utilizing a non-stepper motor such as voice coil motor to position the read/write transducer.

Another object of the present invention is to provide amplification and detection circuitry for use in a servo system to control the movement of a read/write transducer in a magnetic disk drive system wherein orientation information is written upon the face of a magnetic disk in the form of groups of high-frequency sinusoidal signals such that any group of three signals spans two tracks on the face of the disk.

In accordance with the preceding objects, the preferred embodiment of the present invention provides a disk drive control system wherein equally spaced-apart servo sectors are formed on the face of a magnetic recording disk with each of the servo sectors containing three sets of marker pulses comprised of high frequency sinusoidal waves. The marker pulses in each set are arranged such that any group of three pulses spans two tracks on the face of the disk. The system includes synchronizing means to provide first output signals coinciding with the beginning of each servo sector, second output signals to indicate the expected time of arrival of a second pulse within the sector, and third output signals to indicate the expected time of arrival of a third pulse within the sector. Further, circuitry is provided to rectify and amplify the amplitudes of the pulse signals read by the transducer within the servo sectors. Also, a sampling means is connected to the amplifying and synchronizing circuits to sample-and-hold the amplified high frequency sinusoidal signals which comprise the marker pulses; the first value sampled and held is representative of the amplitude of the first marker pulse read in one of the servo sectors, the second value sampled and held is representative of the amplitude of the second marker pulse read in the servo sector, and the third value sampled and held is representative of the amplitude of the third marker pulse read in the servo sector. The output of the circuit is multiplexed and utilized to provide electrical position correcting signals to control the movement of the read/write transducer.

In accordance with the preceding, a primary advantage of the present invention is to provide amplification and detection circuitry for use in a servo system to effectively control the movement of a read/write transducer in a magnetic disk drive system.

More particularly, an advantage of the present invention is to provide amplification and detection circuitry for use in a servo system to control the positioning movement of a read/write transducer in a magnetic disk drive system utilizing a non-stepper motor such as a voice coil motor to position the read/write transducer.

Another advantage of the present invention is the provision of amplification and detection circuitry for use in a servo system to control the movement of a read/write transducer in a magnetic disk drive system wherein orientation information is written upon the face of a magnetic disk in the form of high frequency sinusoidal signals such that any group of three signals spans two tracks on the face of the disk.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
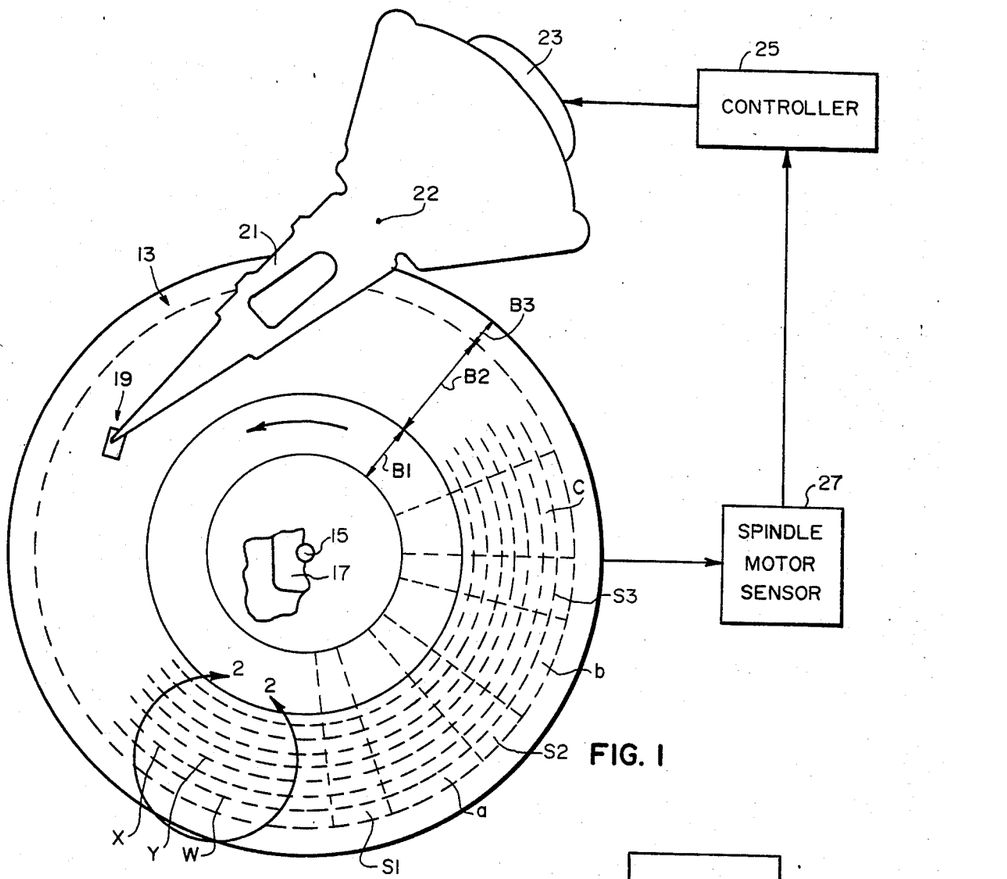
FIG. 1 is a functional diagram showing a magnetic data recording disk system, a portion of which is cut away to illustrate an otherwise hidden component.

In the system in FIG. 1, a magnetic data storage disk 13 is mounted for rotation about a central spindle 15 driven by a spindle motor 17. (In the drawing, a portion of the disk 12 is cut away to reveal the spindle motor 17 which would otherwise be hidden from view.) FIG. 1 also generally shows an electromagnetic read/write transducer 19 for reading information from the face of the disk 13 or for writing information thereon in binary form, an arm 21 pivotably movable about a pivot point 22 for moving the read/write transducer 19 across the face of the disk 13, a motor 23 connected for angularly positioning the arm 21 about the pivot point 22, and a controller 25 for controlling the operation of the motor 23. In practice, the controller 25 is a conventional microprocessor.

Also in the system in FIG. 1, a sensor system 27 is provided to sense angular position of the spindle 17 and to provide such information to the controller 25 for purposes of synchornization of operation of the system For purposes of explanation, the face of the disk 13 in FIG. 1 is shown as divided into three distinct bands B1, B2 and B3. In practice, the three bands are respectively referred to as the inner guard band, the data band, and the outer guard band. Normally, only the data band B2 is utilized to store binary information for processing by the host computer system (not shown) which is served by the disk 13. Further, FIG. 1 shows the data band B2 divided into concentric tracks whose centerline are designated w, x, and y. In the drawing, the width of these tracks has been exaggerated for ease of explanation; in actual practice, the data band on a typical three and one-half inch diameter disk will comprise more than three hundred adjacent data tracks and, typically, will have a track density of more than four hundred tracks per radial inch.

Further, FIG. 1 also shows the tracks w, x, y, etc. divided into spaced-apart sectors a, b, c, etc. The binary information for processing by the host computer system served by the disk 13 is stored on the tracks w, x, y, etc. within the sectors a, b, c, etc., encompassed by the data band B2. To denote the information storage function, the sectors a, b, c, etc. are herein referred to as information sectors. The angular widths of the information sectors a, b, c, etc. are exaggerated in the drawing for ease of explanation; in practice, a three and one-half inch diameter data storage disk will have forty-six information sectors per track, with each sector having the capability of storing several hundred bytes of information in digital form. Located between the information sectors a, b, c, etc. are so-called "servo sectors" S1, S2, etc., arranged such that each information sector is separated from an adjacent information sector by one of the servo sectors; accordingly, if a disk utilizes forty-six information sectors, a total of forty-six servo sectors will also be provided. In practice, the servo sectors S1, S2, S3, etc. comprise about ten percent of the usable area of the face of the disk (i.e., thirty-six degrees); accordingly, the remaining ninety percent of area of the disk face is utilized for the information sectors a, b, c. The function of the servo sectors is to provide information, written upon the disk in magnetic form, to assist in positioning the read/write transducer 19 on the face of the disk 13.

Figure 2:
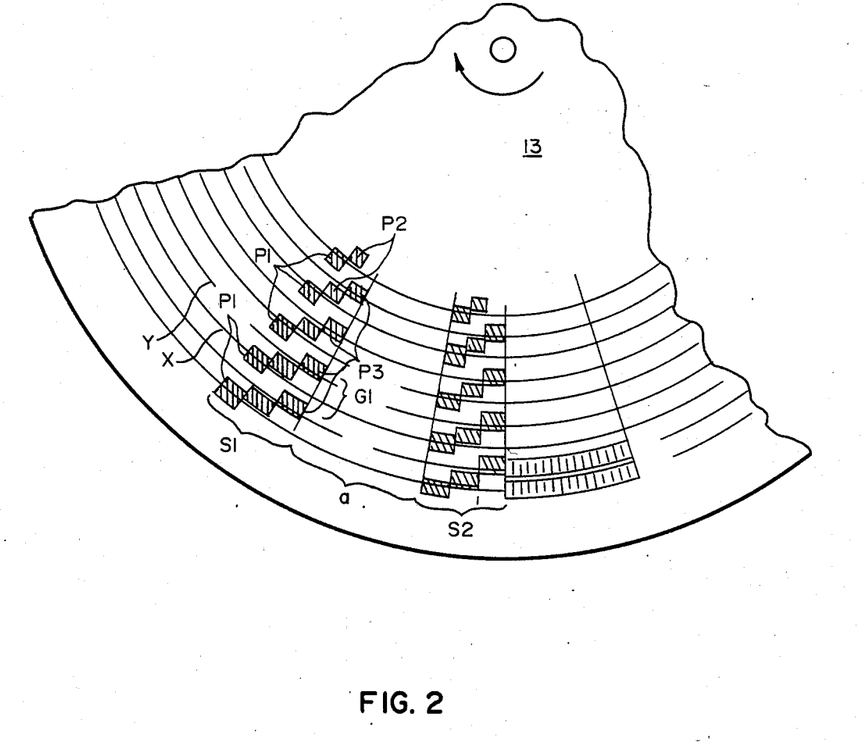
FIG. 2 is a diagram, drawn to an enlarged scale, schematically illustrating a portion of the face of the disk shown in FIG. 1.
Figure 3:
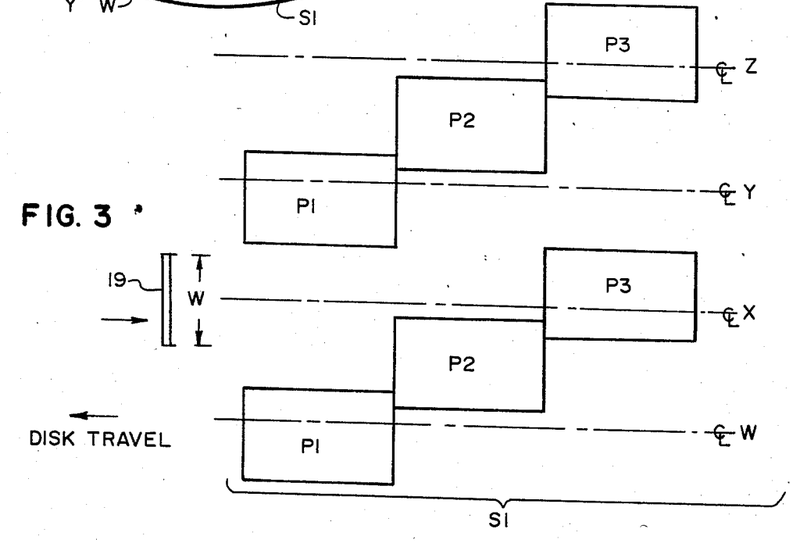
FIG. 3 is a diagram drawn to a further enlarged scale schematically illustrating a portion of the face of the disk of FIG. 1.

Referring now to FIG. 2, it can be seen that each servo sector S1, S2, S3, etc. includes three sets of radially aligned magnetic marker pulses. In the drawings of FIGS. 2 and 3, the magnetic pulses in the first set are designated P1, the pulses in the second set are designated P2, and the pulses in the third set are designated P3. The individual marker pulses are magnetically indistinguishable from one another; thus, any one marker pulse P1 is magnetically the same as any other pulse P1, and is magnetically the same as any pulse P2 or P3. In practice, each marker pulse is a data burst which defines a 1.8 megahertz sine wave, and the duration of each pulse is about eight to ten microseconds when the disk 13 is rotating at 3600 rpm.

Within each servo sector S1, S2, S3, etc., the sets of marker pulses P1, P2 and P3 are geometriclly arranged relative to one another such that the marker pulses P3 clockwise preceed marker pulses P2, and the marker pulses P2 clockwise preceed marker pulses P3. Further, the sets of marker pulses are geometrically arranged relative to one another within each servo sector such that groups of three adjacent marker pulses P1, P2 and P3 are defined wherein the pulse P1 is radially outward of and contiguous with an adjacent marker pulse P2 which, in turn, is radially outward of and contiguous with an adjacent pulse P3. In the preferred embodiment, the radial width of the marker pulses is such that a group of three of the side-by-side pulses P1, P2 and P3 spans two tracks, centerline-to-centerline, on the face of the disk 13 with some overlap between the pulses in the radial direction. Such overlap is shown in the group of three marker pulses in FIG. 2 indicated by the bracket G1; in the group G1, the pulse P3 extends to a location radially outward of the location where the pulse P2 begins, and the pulse P3 extends at a location radially outward of the location where the pulse P1 begins. The pulse group G1 spans tracks x and y.

FIG. 3 schematically shows two groups of marker pulses P1, P2 and P3 and the read/write transducer 19. In practice, the width "W" of the transducer 19 is about eighty percent of the width of a track; thus the transducer 19 will span portions of at least two of the pulses P1-P3 and, depending upon its location, may span portions of all three pulses.

At this juncture, workers skilled in the art will recognize that the detected magnitudes of the magnetic pulses P1-P3 can be utilized in a servo system to position the read/write arm 21 and the read/write transducer 19. More particularly, the detected magnitudes of the pulses P1-P3 can be utilized in a tracking function in a servo control system such that the read/write transducer 19 follows closely the centerline of a designated track of data. For example, the object could be to have the transducer 19 follow the centerline of track x as indicated in FIGS. 2 and 3 when, initially, the read/write transducer 19 is positioned slightly radially inward of the centerline of track x. In such instances, with the disk 13 rotating below the transducer 19 so that marker pulse P1 passes below the transducer followed by marker pulses P2 and P3, the magnetization which characterizes the pulses causes the read/write transducer to generate electrical signals which are analogs of the pulses. After detection, amplification, and other processing, signals representative of the electrical signals provided by the read/write transducer 19 are carried to the controller 25. In this example based upon the orientations shown in FIG. 3, the read/write head 19 would sense all three pulses P1, P2 and P3 after entering the sector S1 and the controller 25 would function to compare the amplitudes of signals representative of all three pulse signals. In practice of the preferred embodiment, the position correcting signals are proportional to the ratio of the difference in amplitude between the two pulse signals in that sector having the larger amplitudes divided by the sum of the two largest amplitudes. In the example of FIG. 3, the pulses having the largest amplitudes sensed by the read/write transducer 19 would be pulses P2 and P3, and the position correcting signal would be based upon the difference in amplitude between pulses P2 and P3 divided by the sum of P2 plus P3.

Figure 4:
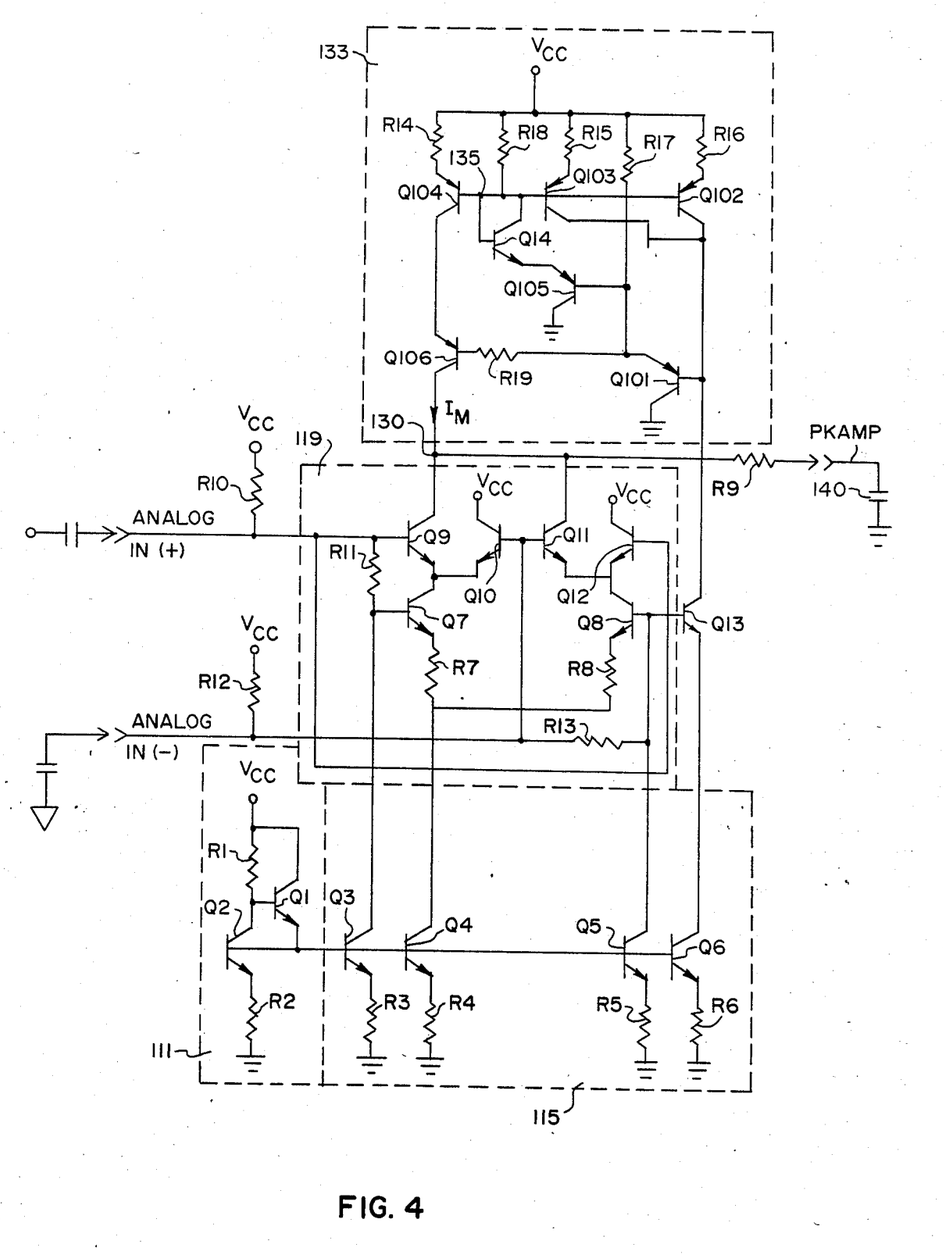
FIG. 4 is a schematic circuit diagram of a detection and amplification circuit according to the present invention.

FIG. 4 illustrates circuitry to rapidly detect and amplify servo signals from the read/write transducer 19 of FIGS. 1 and 3. It should appreciated that such signals are analog signals, which is to say that their amplitude varies continuously in proportion to the magnitude of the magnetic field read from the marker pulses P1–P3. In the circuitry of FIG. 4, the output signals from the read/write transducer 19 are provided on the ANALOG IN (+) line and are to be understood to be current signals whose magnitude varies sinusoidally at a high frequency equal to the frequency of the pulses P1, P2 and P3 (e.g., 1.8 megahertz). The input current signals are shown schematically in FIG. 7 and labelled A BRST, B BRST and C BRST; it should be understood that these signals are produced, respectively, by reading the pulses P1, P2 and P3. The output of the circuitry in FIG. 4 provides full-wave rectified current signals designated in the drawing as PKAMP which are proportional in amplitude to the ANALOG IN (+) signals. Accordingly, the overall circuit of FIG. 4 can be considered to be a high-precision current amplification circuit, and workers skilled in the art will recognize that the overall circuit may be characterized as a double-balanced modulator/demodulator.

It should be recognized that the circuit of FIG. 4 is one which can be readily implemented as an integrated circuit of the bipolar type. In practice, integration of the circuit is made using gate arrays, but other integration techniques ca be utilized.

In FIG. 4, the circuitry 111 provides constant base current and voltage to transistors utilized in subsequent current source circuitry. In circuit 111, a transistor Q2 is connected in the common emitter configuration. Resistor R1 is connected between a constant voltage source Vcc and the collector of the transistor Q2. (In practice, Vcc is +12 volts.) Resistor R2 is connected between the emitter of the transistor Q2 and ground, and acts as an emitter ballast resistor. Current to the base of the transistor Q2 is provided by the transistor Q1, which acts as a buffer.

The function circuitry 115 in FIG. 4 is to provide a constant current source for subsequent circuitry. In the circuit 115, transistors Q3–Q6 are connected in parallel with their emitters connected to ground via ballast resistors R3–R6, respectively. In practice, resistors R2–R6 are of equal value. The transistors Q3–Q6 have, at each of their bases, the constant voltage provided by the circuitry 111. The transistor Q3–Q6 can be described as a current mirror string, since the collector current of each of the transistors Q3–Q6 equals the collector current of the transistor Q2. The current provided by the transistors Q3–Q6 will be referred to hereinafter as the source current.

The circuitry 119 in FIG. 4 comprises a low gain linear amplifier which operates upon the input current signal ANALOG IN (+) line. In the circuit 119, the emitter of an amplifying transistor Q7 is connected to the collector of the current source transistor Q4 via a resistor R7, and the emitter of an amplifying transistor Q8 is likewise connected to the collector of current source transistor Q4 through a resistor R8. In practice, the node between the current source transistor Q4 and the resistors R7 and R8 is at a potential of about +3 volts.

Biasing voltage at the base of the amplifying transistor Q7 in the circuit 119 is provided by the current source transistor Q3, whose collector is connected to the constant voltage source Vcc via series resistors R10 and R11. At the node between the resistor R11 and the base of the amplifying transistor Q7, the ANALOG IN (+) line carries the A BRST, B BRST and C BRST signals to drive the transistor Q7.

Biasing voltage at the base of the amplifying transistor Q8 is provided by the current source transistor Q5, whose collector is in series with the voltage source Vcc and the resistors R12 and R13. The ANALOG IN (−) line is AC grounded, and thus does not drive the amplifying transistor Q8. In practice, the resistors R10 and R12 are equal in value, and the resistor R11 and R13 are equal; accordingly, in the absence of input signals on the ANALOG IN (+) line, the potential at the base of the amplifying transistor Q7 is the same as the potential at the base of the amplifying transistor Q8.

As also shown in FIG. 4, the emitters of transistors Q9 and Q10 are connected to the collector of the amplifying transistor Q7, and the emitters of transistors Q11 and Q12 are connected to the collector of the amplifying transistor Q8. Biasing voltage for transistors Q9 and Q12 is provided at the node between resistors R10 and R11; accordingly, the bases of those transistors also receive the input signals on the ANALOG IN (+) line. The collector of the transistor Q10 is connected to the constant voltage source Vcc, and the collector of the transistor Q9 is connected to a node 130. Similarly, the collector of the transistor Q12 is connected to the constant voltage source Vcc, and the collector of the transistor Q11 is connected to the node 130. The bases of both transistors Q10 and Q11 are connected at the node between resistors R12 and R13, which is at a constant voltage with the ANALOG IN (−) line AC grounded.

FIG. 4 further shows a transistor Q13 having its emitter connected to the collector of the current source transistor Q6 and its base connected to the base of the transistor Q8. The collector of the transistor Q13 is connected to a current mirror circuit 133. In operation, the base of the transistor Q13 is at the same constant potential as the base of the transistor Q8, and the collector current of the transistor Q13 is equal to the collector current of the transistor Q6. The purpose of the transistor Q13, which can be recognized to be connected in the common base configuration, is to provide isolation such that voltages generated in the current mirror circuit 133 do not affect the current source transistor Q6.

The function of the current mirror circuitry 133 in FIG. 4 is to provide constant current $I_M$ to the node 130; in practice the amplitude of the current $I_M$ is equal to about fifty percent of the current through the collector of the current source transistor Q6.

Within the current mirror circuitry 133, the constant voltage source Vcc is connected at node 135 to the bases of n-p-n transistors Q102-104 through resistor R18. Also the constant voltage source Vcc is connected to the emitter of the transistor Q104 through a resistor R14, to the emitter of the transistor Q103 through a resistor R15 and to the emitter of the transistor Q102 through a resistor R16. The collectors of the transistors Q102 and Q103 are connected to the collector of the transistor Q13. In practice, the resistors R14–R16 are equal in value to one another, and the R18 has a substantially larger value than the resistors R14–R16.

Also in the current mirror circuitry 133, the bases of the transistors Q102-104 are connected at node 135 to an n-p-n transistor Q14 mounted in a diode configuration with its emitter connected to the emitter of a p-n-p transistor Q105. The collector of the transistor Q105 is connected to ground and, thus, the transistor Q105 can be said to be in the common collector configuration. The base of the transistor Q105 is connected to the constant voltage source Vcc via a resistor R17 and is connected to the emitter of a p-n-p transistor Q101 whose collector is grounded. Further, the base of the transistor Q105 and the emitter of the transistor Q101 are connected to the base of a transistor Q106 via a base-input resistor R19. The base of the transistor Q101 is connected to the collector of the current-source transistor Q13.

Still further in the current mirror circuitry 133, the collector of the transistor 104 is connected to the emitter of the transistor 106. The collector of the transistor 106 is connected to the node 130. The collectors of the transistors 104 and 106 carry the previously mentioned current $I_M$.

As still further shown in FIG. 4, the output current signal PKAMP is carried from node 130, via a resistor R9, to a grounded capacitor 140. In practice, the capacitor 140 has a value of about 50-picoforads.

Operation of the circuitry of FIG. 4 can now be understood. Initially, it will be assumed that no signal current is received on the ANALOG IN (+) line. For this situation, the values of the resistors R10, R11, and R3 as well as the current through the collector of the current source transistor Q3 are predetermined so as to bias the amplifying transistors Q7 and Q9 to the "on" or conducting condition. Similarly, the amplifying transistors Q8, Q10–Q13 are biased in the conducting condition. Thus, in operation, the current source transistor Q4 operates to draw current equally through the emitters of the transistors Q7 and Q8. Further, the collector current of transistor Q7 divides equally between the emitters of the transistors Q9 and Q10, and the collector current of the transistor Q8 divides equally between the emitters of the transistors Q11 and Q12. Thus, at the node 130, one-quarter of the source current will flow into each of the collectors of the transistors Q9 and Q11.

The operation of the current mirror circuitry 133 will now be considered under the condition where no input signal current is received on the ANALOG IN (+) line. Because full source current flows through the collectors of the transistors Q6 and Q13, the transistor Q13 establishes a voltage at the base of the transistor Q101 sufficient to bias the transistor Q101 for conduction. The transistor Q101 establishes, in conjunction with the constant voltage source Vcc and the resistor R17, the base biasing voltage for the transistors Q105 and Q106. More particularly, the base biasing voltage provided by transistor Q101 causes the common-collector transistor Q105 to operate as an emitter follower and, thus, to provide an emitter-to-collector voltage equal to its base-to-emitter voltage drop (in practice, about 0.6 volts). Because the emitter of the transistor Q105 is connected to the constant voltage source Vcc through the diode-connected transistor Q14 and the resistor R18, a voltage level is established at the node 135 which biases the transistors Q102, Q103 and 104 to a conducting condition. Conduction of the transistors Q102 and Q103 allows the current from the current source transistor Q6 to divide equally between them, so that the transistors Q102 and Q103 each carry one-half of the source current. Conduction of the transistors Q102 and Q103 through equal resistors R15 and R16 allows the current from current source transistor Q6 to divide equally between them. A very small fraction of the total current, amplified by transistors Q101 and again by transistor Q105 will maintain a voltage at node 135 that causes transistors Q102 and Q103 and Q104 to each produce a one half current. In practice, the voltage drop of about 2 volts produced by transistors Q101, Q105, and Q14 assures that the collectors of transistors Q102 and Q103 stay well away from saturation. The transistor Q106 provides a voltage source to the collector of transistor Q104 that is near the voltage of the collectors of transistors Q102 and Q103

At this juncture, it should be recalled that one-half of the source current is also provided at node 130 through the collectors of the transistors Q9 and Q11 when the input current on the ANALOG IN (+) line is zero. Accordingly, to satisfy the charge balance requirement at node 130 under such conditions, the collectors of the series transistors Q104 and 106 will also carry one-half of the source current. Thus, under such conditions, the current mirror circuitry 133 provides the current $I_M$ into node 130 which exactly cancels the current provided to the node from the amplification circuitry 111.

Operation of the circuit of FIG. 4 will now be described for the situation where the polarity of the input signal on the ANALOG IN (+) line goes positive. In this situation, the base current to the transistors Q7, Q9 and Q12 will increase and, consequently, the current amplification provided by those transistors will increase with the input signal polarity swing. The transistor Q8 will respond only differentially. Accordingly, proportionately more than half of the source current will flow through transistor Q7 and proportionately less through transistor Q8. Simultaneously, the current mirror circuitry 133 provides constant current $I_M$ at node 130. The net result during such times is that current is available at node 130 to charge the capacitor 140; thus, the charge on the capacitor 140 provides negative voltage representative of positive half-wave detection of the input signal on the ANALOG IN (+) line. In this situation, the transistor Q106, functions to provide constant emitter-to-collector current independent of changing voltage conditions at its collector.

Similarly, operation of the circuit of FIG. 4 can be described where the polarity of the input signal on the ANALOG IN (+) line goes negative. In this situation, the current at the bases of transistors Q7, Q9 and Q12 will decrease and, consequently, the collector-to-emitter current through those transistors will decrease. Accordingly, proportionately more than half of the source current will flow through transistor Q8 and proportionately less through transistor Q7. Further, the division of current between the transistors Q11 and Q12 will no longer be equal (because the transistor Q12 becomes relatively less conducting); as a result, the collector-to-emitter current through the transistor Q11 will increase toward a maximum equal to the full source current. Simultaneously, the current mirror circuitry 133 provides constant current $I_M$ at node 130. The net result during such times is that current is available at node 130 to flow to the capacitor 140, and the charge on the capacitor 140 provides negative voltage representative of negative half-wave detection of the input signal.

Thus, it will be appreciated that the circuit of FIG. 4 provides positive voltages on the capacitor 140 during both positive and negative excursions of the input signals on the signal ANALOG IN (+) line; in other words, the circuit provides full-wave rectification. Moreover, the current mirror circuitry 133 provides a constant balancing current $I_M$ at all times, thereby enabling the circuit of FIG. 4 to accurately detect the small and rapidly varying input signals A BRST, B BRST and C BRST.

With regard to the current mirror circuitry 133 in FIG. 4, it should be recognized that the internal collector-to-base capacitances of transistors Q102–104 ordinarily would limit the speed of operation of the current mirror circuitry 133 at high frequencies. In the illustrated circuitry, such effect of the collector-to-base capacitances of transistors Q103 and Q104 is minimized by maintaining the DC voltage level of the bases of those transistors near constant voltage Vcc. Also, the transistors Q101 and Q105 decrease the effects of the base-collector capacitances of transistors Q102–Q104 by providing current amplification. With both of the transistors Q101 and Q105 connected in a common collector configuration, each of them operates as a current amplifier without drawing substantial base current. In practice, the current gain provided by transistors Q101 and Q105 together is about six hundred. Accordingly, any small change in the collector current of transistor Q13 (or the collector currents of transistors 102 and 103) will be rapidly amplified and will appear as emitter current of the transistor Q105 without drawing substantial current at the base of the transistor Q101. The net effect of the operation of transistors Q101, 105 and 14 is to increase the reverse bias voltage on the collector-to-base junctions of transistors Q102–Q104 and, hence, to reduce the effective collector-to-base capacitance of those transistors.

The function of the transistor Q104 is to provide constant current $I_M$ at all times during operation of the circuit of FIG. 4. Toward this end, the common base transistor Q106 provides isolation of the transistor Q104 from the transistor Q9 in the amplification circuitry 111.

In practice, the circuit of FIG. 4 provides amplification and full-wave rectification of the input signals in about 3.3 microseconds.

Figure 5:
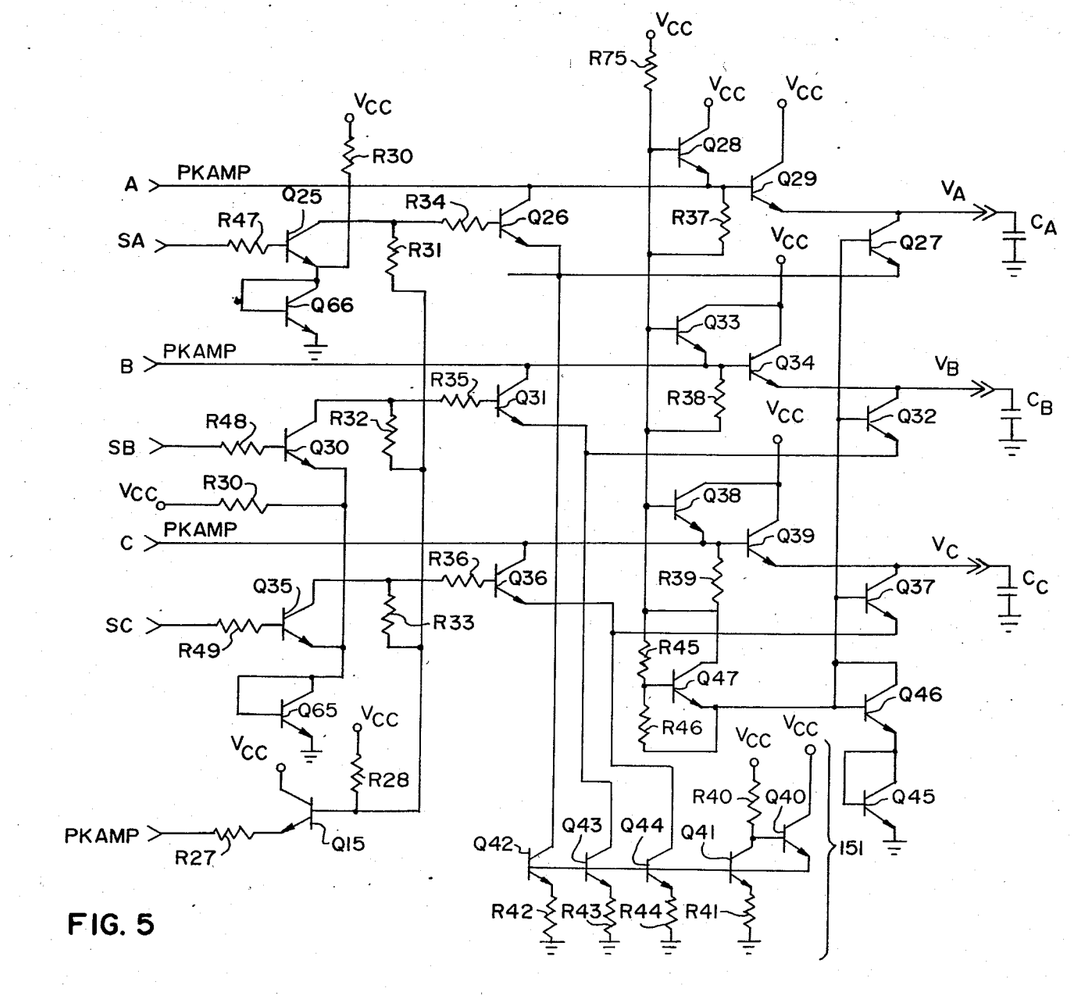
FIG. 5 is a schematic diagram of a circuit for operating upon the output of the circuit of FIG. 4.

FIG. 5 illustrates a circuit for establishing output voltages (labelled VA, VB, VC) which are correspondingly representative of the rectified amplitude of the signals A BRST, B BRST and C BRST detected by the circuit of FIG. 4; in view of this function, the circuit of FIG. 5 can be called a sample-and-hold circuit. The circuit of FIG. 5 includes three separate input lines SA, SB and SC which carry synchronizing pulses coinciding in time with the expected time of arrival of the pulses P1, P2 and P3. That is, a signal pulse on line SA will occur when, and only when, the read/write transducer 19 FIG. 1 is expected to read a pulse P1 from the face of the magnetic disk 13; likewise a signal pulse on line SB will occur when, and only when, the read/write transducer 19 is expected to read a pulse P2, and similarly for input line SC. The synchronizing signals on lines SA, SB and SC are generated, for example, by conventional means which sense angular movement (i.e. rotation) of the disk 13 of FIG. 1.

In the sample-and-hold circuit of FIG. 5, the synchronizing signal on line SA is fed to the base of a transistor Q25 via a resistor R47. Likewise, synchronizing on line signal SB is fed to the base of a transistor Q30 via a resistor R48, and synchronizing signal on line SC passes to the base of a transistor Q35 via resistor R49. The emitters of the transistors Q25, Q30 and Q35 are connected to the constant voltage source Vcc through equal valued resistors R30. The transistors Q25, Q30 and Q35 operate as logic gates to provide collector current when, and only when, the gates are enabled by a synchronizing signal. That is, transistor Q25 conducts collector current only during the time that it receives a positive signal on line SA; likewise, transistor Q30 conducts only during the time that it receives a positive signal on line SB, and similarly for transistor Q35.

The emitter of the transistor Q25 in FIG. 5 is separated from ground by a diode-connected transistor Q66 and, likewise, the emitters of transistors Q30 and Q35 are separated from ground by a diode-connected transistor Q65. The collector of the transistor Q25 is connected to the constant voltage source Vcc through a resistor R31 in series with a resistor R28; likewise the collector of the transistor Q30 is connected to the constant voltage source Vcc through resistor R32 in series with the resistor R28, and the transistor Q35 is connected to the constant voltage source Vcc through the resistor R33 in series with the resistor R28. (In practice, the resistors R31–R33 are identical.) In operation, the collector of the transistor Q25 will be in an open circuit condition at voltage Vcc until such time as the transistor Q25 receives a positive pulse on line SA and, thus, conducts collector-to-emitter current. When the transistor Q25 is conducting, the voltage at its emitter will fall towards ground and stabilize at a potential above ground equal to the voltage drop across the diode-connected transistor Q66. Likewise, the emitter voltages of the transistors Q30 and Q35 will drop from voltage Vcc to a relatively lower potential after those respective transistors begin to conduct.

As further shown in FIG. 5, the collector of the transistor Q25 is connected to the base of a transistor Q26 by a resistor R34, the collector of the transistor Q26 is connected to the base of a transistor Q31 by a resistor R35, and the collector of the transistor Q35 is connected to the base of a transistor Q36 by a resistor R36. FIG. 5 further shows three separate input lines A, B and C, each of which carries a current signal equivalent to PKAMP. The input line A is connected to the collector of the transistor Q26, input line B is connected to the collector of the transistor Q31, and the input line C is connected to the collector of the transistor Q36. The emitters of the transistors Q26, Q31 and Q36 are connected to transistors Q42, Q43 and Q44, respectively within a circuit generally designated by the bracket 151. The circuit 151 can be recognized as a constant current source which is essentially the same in structure and function as the circuitry 111 and 115 in FIG. 4. Accordingly, in operation, the constant current source 151 provides constant current to the emitters of transistors Q26, Q31 and Q36.

Operation of the transistors Q26, Q31 and Q36 in the circuit of FIG. 5 can now be readily understood. The transistor Q26 will conduct current mirroring the current source 151 until such time as the voltage at its base goes "low" (i.e., below the cutoff voltage). Similarly, the transistors Q31 and Q36 will mirror the source current until such time as their base voltage goes low. During the time that the transistor Q26 is conducting, it will effectively shunt off transistor Q114 (FIG. 5). Likewise, when the transistor Q31 is conducting, transistor Q113 will be shunted off, and when transistor Q36 is conducting, transistor Q112 will be shunted off. Because of this function, the transistors Q26, Q31 and Q36 will be referred to herein as shunting transistors. When the shunting transistor Q26 is not conducting, the signal on line A is unaffected; similarly, the signals on lines B and C are not affected when shunting transistors Q31 and Q36, respectively, are not conducting. When a positive pulse is received on line SA, the inverter transistor Q25 will shut off the sunting transistor Q26. Similarly, shunting transistors Q30 and Q35 will cease conducting when a positive pulses are received on lines SB and SC, respectively. Accordingly, current will appear on line A only during periods when a positive clocking pulse appears on line SA; likewise, current will appear on line B only during periods when a positive clocking pulse appears on line SB, and current will appear on line C only when a positive clocking pulse appears on line SC.

FIG. 5 further shows line A connected to a resistor R37 which, in turn, is connected to the constant voltage source Vcc through a resistor R75. Likewise, line B is connected to a resistor R38 which, in turn, is connected to the voltage source Vcc via the resistor R75, and line C is connected to a resistor R39 which is connected to the voltage source Vcc also through the resistor R75. As further shown in FIG. 5, the base of on emitter-follower transistor Q29 is connected at the node between the resistor R37 and line A. The emitter of the transistor Q29 is connected to ground through a capacitor $C_A$. The collector of the transistor Q29 is connected to the constant voltage source Vcc.

FIG. 5 further shows circuitry to discharge the capacitors $C_A$ in the event that a signal carried by the line A is such as would produce a voltage at capacitor $C_A$ less than the voltage previously existing at that capacitor. The circuitry includes a transistor Q27 whose collector is connected to the emitter of the common-collector transistor Q29 and whose emitter is connected to the emitter of the shunting transistor Q26. The base of the transistor Q27 is connected to ground through a pair of diode-connected transistors Q46 and Q45. The voltage on the base of the transistor Q27 is established by a transistor Q47 in conjunction with the diode-connected transistors Q45 and Q46. More particularly, diode-connected transistors Q45 and Q46 are connected to the emitter of the transistor Q47, the collector of the transistor Q47 is connected to the constant voltage source Vcc through the resistor R75, and base of the transistor Q47 is connected to the voltage source Vcc via a resistor R45 in series with the resistor R75. The emitter of the transistor Q47 is connected, via a resistor R46 to the node between the base and the resistor R45.

FIG. 5 further shows a transistor Q15 whose base is connected to the node between resistor R28 and the resistors R31–33. The collector of the transistor Q15 is connected to the constant voltage source Vcc and the emitter is connected, via a resistor R27, to the capacitor 140 of FIG. 4 (not shown in FIG. 5) to received the PKAMP signals. Connected in such a configuration, the transistor Q15 can be considered to be an emitter-follower.

Operation of the sample-and-hold circuit of FIG. 5 can now be understood. Initially, it will be assumed that no positive pulses have arrived on lines SA, SB or SC. Accordingly, at such times, no collector-to-emitter current will flow through the transistors Q25, Q30 or Q35. With the transistors Q25, Q30 and Q35 being non-conducting, no current will pass through the resistors R31, R32 and R33, respectively, and the base of the emitter-follower transistor Q15 will be at the potential of the constant voltage source Vcc. Consequently, the voltage at the emitter of the emitter-follower transistor Q15 will be close to the voltage at the constant voltage source Vcc. During such times, the voltage at the emitter of the transistor Q15 will charge the capacitor 140 (FIG. 4); in practice, the charge is about ten volts.

Until a positive pulse is received on line SA, SB or SC, the transistors Q26, Q31 and Q36 will effectively shunt any currents on lines A, B or C.

When a positive signal is received on the line SA, the transistor Q25 will conduct current from its collector to this emitter. When the transistor Q25 conducts, the voltage at its emitter will fall from the constant voltage Vcc towards ground and stabilize at a potential equal to the voltage drop across the diode-connected transistor Q66. The collector current of the transistor Q25 will be drawn through the resistors R31 and R28 which, together act as a voltage divider; as a result, the voltage at the base of the emitters-follower transistor Q15 will fall. When the voltage at the base of the emitter-follower transistor Q15 decreases, the voltage at its emitter likewise decreases and, consequently, the capacitor 140 of FIG. 4 is placed in condition to be charged by a PKAMP signal.

Also, when the gating transistor Q25 in FIG. 5 begins to conduct, it will pull the voltage at the base of the shunting transistor Q26 toward ground and, hence, below its cutoff voltage. Under such conditions, the shunting transistor Q26 will no longer shunt current from line A. In practice, the value of the resistor R31 is such that, when gating transistor Q25 conducts, the voltages at the bases of the shunting transistors Q31 and Q36 remain high enough that the transistors Q31 and Q36 remain in the conducting state and, hence, continue to shunt the current on lines B and C. Likewise, when gating transistor Q30 conducts, the voltages at the bases of the shunting transistors Q26 and Q36 remain high enough that transistors Q26 and Q36 still conduct; and similarly for the case where the gating transistor Q35 conducts.

After the shunting transistor Q26 in FIG. 5 cuts off, current flows on line A to provide a voltage created at resistor R37 proportional to the current. Similarly, a voltage is created at resistor R38 associated with line B, and at resistor R39 associated with line C when the respective shunting transistors Q31 and Q36 are below their cutoff voltages.

Also, when the shunting transistor Q26 is cutoff, the current on line A drives the base of the emitter-follower transistor Q29. As a result the transistor Q29 provides emitter current to charge the capacitor $C_A$ to a voltage proportional to the voltage on resistor R37 less the voltage drop across transistor Q29. In a similar fashion, when the shunting transistor Q31 is cutoff, the emitter-follower transistor Q34 establishes a voltage across the capacitor $C_B$ proportional to the voltage across resistor R38. Likewise, when the shunting transistor Q36 is cutoff, the emitter-follower transistor Q39 provides current to establish a voltage across the capacitor $C_C$ proportional to the voltage across resistor R39. Further, with shunting transistor Q26 cutoff and transistor Q29 conducting, the emitter-follower transistor Q27 will carry the current provided by the current source transistor Q42, and such current will discharge capacitor $C_A$ if the previously stored voltage thereon was greater than the voltage across resistor R37. In other words, if an earlier sampling period is referred to as occurring at time T1 and a latter sampling period is referred to as occurring at time T2, and if current to charge the capacitor $C_A$ during time T2 is less than the current to charge the capacitor $C_A$ during time T1, the differential charge on the capacitor $C_A$ will flow through the transistor Q27, with a resultant decrease of charge on the capacitor $C_A$.

When a positive input is no longer present on line SA, the gating transistor Q25 is cutoff and the shunting transistor Q26 is again turned on. With the latter transistor conducting, the base of emitter-follower transistor Q29 is reverse biased and, hence, the transistor 29 becomes nonconducting, thereby leaving the sampled charge on capacitor $C_A$. Also when transistor Q26 is conducting, the pull-down load current from transistor Q42 is taken away from transistor Q27 tied to the emitter of transistor Q29; as a result, transistor Q29 does not discharge capacitor $C_A$. With the capacitor $C_A$ in an open circuit condition, the charge placed upon the capacitor during time T2 will remain unaffected until such time as another positive signal is received on input line SA. Thus, it can be appreciated that transistors Q26 and Q27 are an emitter-coupled pair which operate to simultaneously cutoff any discharge current from the capacitor $C_A$ whenever the emitter-follower transistor Q29 becomes nonconducting. In otherwords, the emitter-coupled pair of transistors Q26 and Q27 exchange current at the end of a sampling period (as determined by a positive pulse on line SA) and thus provide emitter-coupled switching of the current which pulls up, or pulls down, the voltage at the capacitor $C_A$. In a similar manner, voltage placed upon the capacitor $C_B$ at the end of a sampling period is determined by a positive pulse on input line SB. Likewise, a voltage is placed on capacitor $C_C$ at the end of a sampling time determined by a positive pulse on input line SC.

Figure 6:
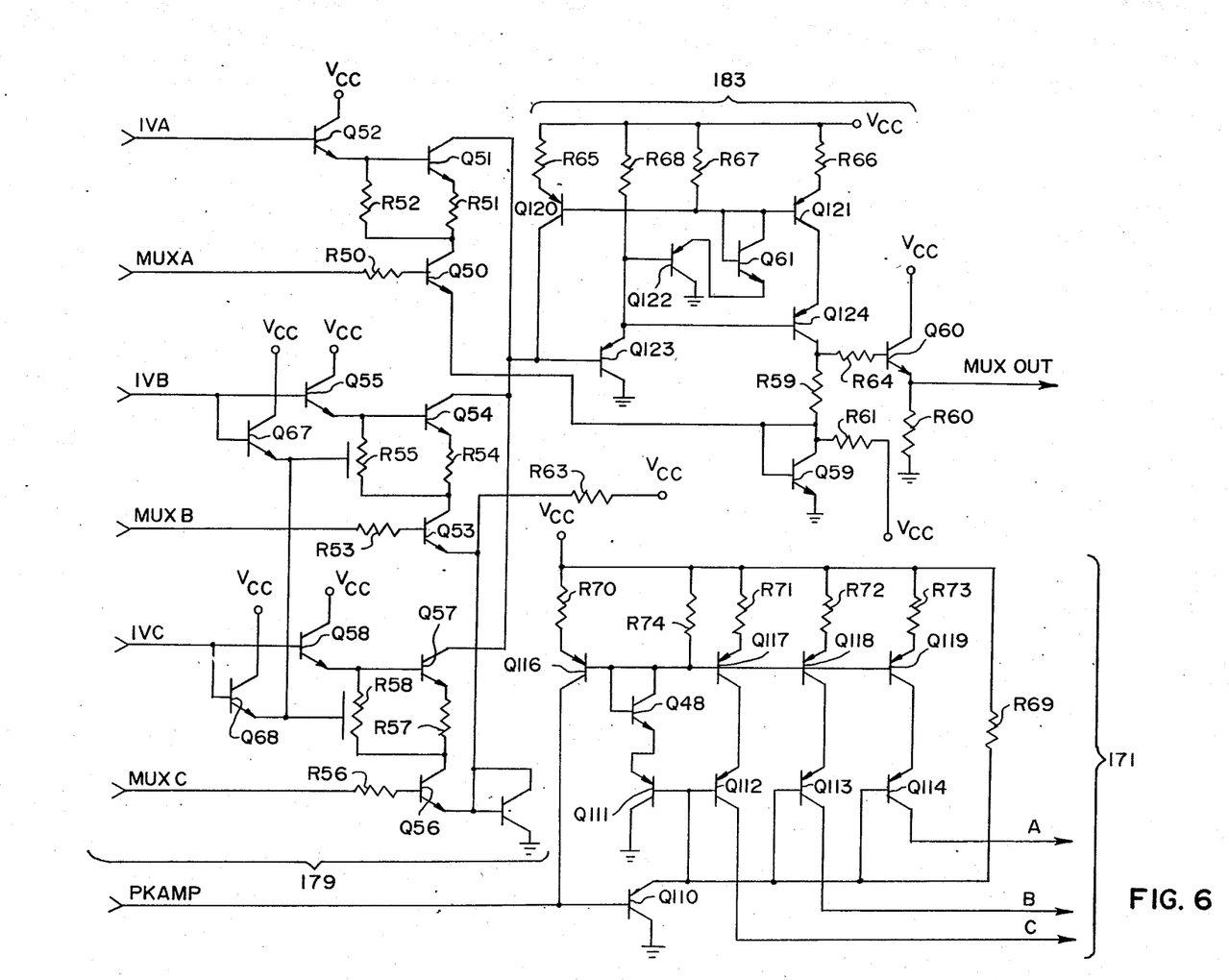
FIG. 6 is a schematic diagram of other circuitry for operating upon the output of the circuit of FIG. 4.

FIG. 6 shows circuitry generally designated by the bracket 171 for developing the currents on lines A, B and C utilized in conjunction with the sample-and-hold circuit of FIG. 5. FIG. 6 also shows circuitry generally designated by the bracket 179 for multiplexing signals derived from the voltages appearing on capacitors $C_A$, $C_B$ and $C_C$ in FIG. 5.

The circuitry 171 in FIG. 6 receives, as an input, a PKAMP signal at the base of a common-collector transistor Q110 and at the collector of a p-n-p transistor Q116. The emitter of the transistor Q110 is coupled to the constant voltage source Vcc through resistor R69, and the emitter of the transistor Q116 is coupled to the constant voltage source Vcc through a resistor R70. The base of the transistor Q116 is connected to the bases of a parallel array of transistors Q117–Q119. The emitters of the transistors Q117–Q119 are connected to the constant voltage source Vcc through resistors R71–R73, respectively. In practice, the resistors R70–R72 are all of the same value. The collectors of the transistors Q117–Q119 are connected to the emitters of transistors Q112–Q114, respectively. The bases of the transistors Q112–Q114 are each connected to the emitter of the transistor Q110. The collectors of the transistors Q112–Q114 are the lines A, B and C, respectively, which serve as inputs to the sample-and-hold circuit of FIG. 5.

As further shown in FIG. 6, the base of the transistor Q116 is connected to a diode-connected transistor Q48. The emitter of the diode-connected transistor Q48 is connected to the emitter of a common-collector transistor Q111. The base of the common-collector transistor Q111 is tied to the bases of the parallel array of transistor Q112–Q14 and to the emitter of the transistor Q110.

The function of the circuit 171 in FIG. 6, speaking generally, is to receive the PKAMP current as on input and to provide output currents simultaneously on lines A, B and C. In other words, stated somewhat differently, the circuit 171 in FIG. 6 can be said to provide a protected current mirror; that is, the circuit 171 accepts the averaged current from the demodulator into transistor Q116 and produces three equal currents from transistors Q117, Q118, and Q119 which are protected from output voltage variations by transistors Q12, Q113, and Q114 respectively. In the circuit 171, PKAMP current places the common-collector transistor Q110 in the conducting condition with respect to the voltage source Vcc, thereby establishing a voltage drop across the transistor and essentially the entire PKAMP current appears as collector current of the transistor Q116. It should be noted that the transistor Q116 is connected in the common-emitter configuration; accordingly, with the base of the transistor Q116 connected to the bases of the parallel array of identical transistors Q117–Q119 and with the resistors R70–R72 all having the same values, the emitter-to-collector current through each of the transistors Q117–Q119 will be essentially the same as the emitter-to-collector current through the transistor Q116. Thus, each of the Q117–Q119 can be considered to be a mirror for the current through the transistor Q116.

The circuitry identified by the bracket 179 in FIG. 6 is for purposes of multiplexing the output signals VA, VB and VC provided by the circuit of FIG. 5. The output signal MUX OUT from the circuit of FIG. 6 provides a serial sequence of the input signals.

In the multiplexing circuit 179, a line carrying the signal IVA is connected to the base of a buffer transistor Q52 in the common-collector configuration with its collector connected to the constant voltage Vcc. The emitter of the buffer transistor Q52 is connected to the collector of a gating transistor Q50 through a large value resistor R52. The base of the gating transistor Q50 is connected to receive an input signal MUX A through a base input resistor R50. The MUX A signal is a synchronizing signal equivalent to the synchronizing signal SA described in conjunction with FIG. 5. (Similarly, the MUX B and MUX C signals in FIG. 6 correspond to the SB and SC signals, respectively in FIG. 5). The emitter of the gating transistor Q50 is held at a constant DC voltage determined by the voltage source Vcc and a diode-connected transistor Q59 tied to ground. The collector of the gating transistor Q50 is connected, via a resistor R51, to the emitter of a transistor Q51. The base of the transistor Q51 is connected to the emitter of the buffer transistor Q52, and the collector of the transistor Q51 is connected to the current mirror curcuit 183.

In operation, the transistor Q50 of the multiplexing circuit 179 of FIG. 6 can be understood to be acting as a gate to provide collector current only when the MUX A timing signal is received. Thus, the gating transistor Q50 controls the transistor Q51 such that collector current flows through transistor Q51 only during times when gating transistor Q50 is conducting due to the presence of a MUX A signal. During the times when the synchronizing signals MUX A are not received, the transistor Q52 provides leakage current only, and virtually isolates the capacitor $C_A$. During periods when the synchronizing signals MUX A are received at the base of the gating transistor Q50, the transistor Q51 provides collector current representative of the input signal IVA amplified. In otherwords, the synchronizing signal MUX A gates the collector-to-emitter current through the transistor Q51 and such current represents an essentially linear amplification of the IVA signal.

Also, in the circuit 179 in FIG. 6, the signal IVB is amplified and gated through a transistor Q54 by the MUX B signal received at the base of a gating transistor Q53. Also, the input signal IVC is amplified and gated through a transistor Q57 by the MUX C signal received at the base of a gating transistor Q56. Accordingly, the circuit 174 in FIG. 6 serves to provide a serial sequencing, or multiplexing, of the input signals IVA, IVB and IVC.

The circuit 183 in FIG. 6 is a current mirror circuit which receives the multiplexed output of the circuit 179. More particularly, in the current mirror circuit 183, the transistors Q120 and Q121 provide mirrors for the collector currents of transistors Q51, Q54 and Q57 of the multiplexing circuit 179. The output of the circuit 183 can be considered to be the voltage which appears across a resistor R59 connected to ground via a diode-connected transistor Q59. One node of the resistor R59 is connected to the base of a buffering transistor Q60 via a resistor R64. The collector of the buffering transistor Q60 is connected to a constant voltage source $V_{cc2}$, and the emitter of the transistor Q60 is connected to ground via a resistor R60. The output signal provided by transistor Q60, designated MUX OUT, is the voltage appearing across the resistor R60 which, in turn, is representative of the voltage across the resistor R59. Thus, the output signal MUX OUT can be considered representative of the multiplexed input signal received by the current mirror circuit 183. Even more generally, the MUX OUT signal can be understood to be the final signal produced by the circuits of FIGS. 4, 5 and 6.

The coordinate operation of circuits 179 and 183 in FIG. 6 can now be understood. Assuming that the MUX A signal is high, the gating transistor Q50 becomes conductive and permits the transistor Q51 to provide emitter current through resistor R51. Thus, during such times, the combination of transistor Q51 and resistor R51 can be considered to be a current source where the amplitude of the current is proportional to the input voltage signal IVA as buffered by the transistor Q52. The current provided by transistor Q51 through the resistor R51 is mirrored through the transistors Q120–Q124 to provide a voltage across the resistor R59 proportional to the current through the transistor Q51. Further, in the circuit 183, the diode-connected transistor Q59 compensates for the emitter-follower voltage drop of the buffer transistor Q60. The resistor R60 acts as a pull-down resistor to permit the output voltage MUX OUT to go to zero. Because the timing signals MUX A, MUX B and MUX C are provided in a serial sequence, only one of the transistors Q51, Q54 or Q57 is conducting at any give time. Thus, the emitters of the transistors Q51, Q54 and Q57 are tied together to provide an input signal to the current mirror circuit 183. The input signals to the circuit 183 from the transistors Q51, Q54 and Q57 can now be understood to be a multiplexed and serially representative of the input signals IVA, IVB and IVC; likewise, the output signal MUX OUT is a serial sequence of the input signals IVA, IVB and IVC.

It should be appreciated that the MUX OUT signal is an analog signal. Thus, in practice, the MUX OUT signal is processed through a conventional analog-to-digital converter (not shown) and then conveyed to the micro-processor utilized in the controller 23 of FIG. 1.

Figure 7:
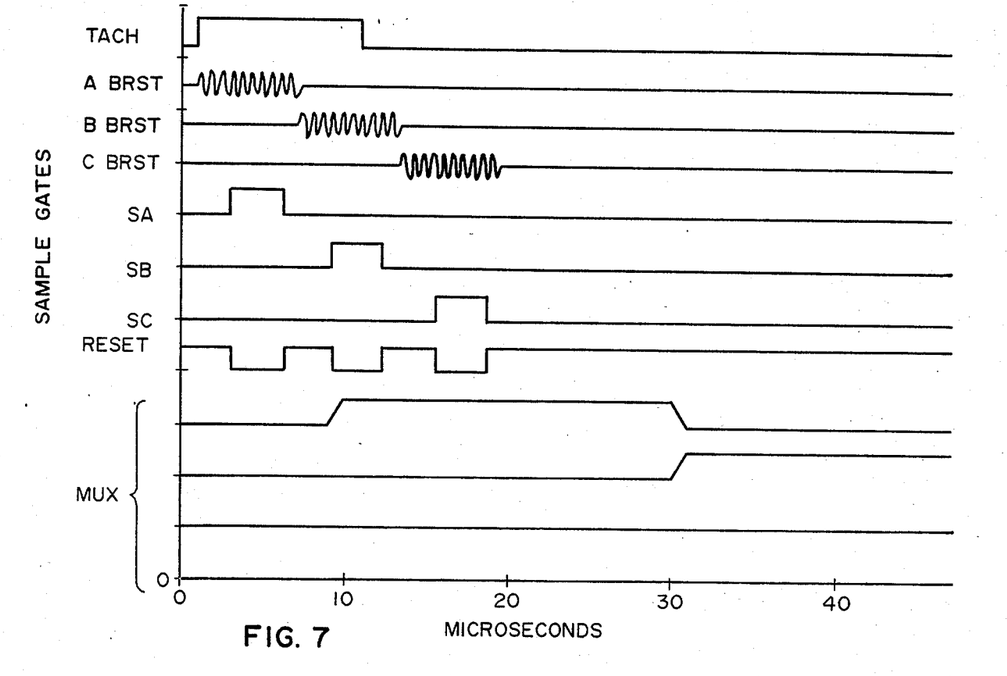
FIG. 7 is a timing diagram showing electrical signals produced by the circuits of FIGS. 4 and 5.
Figure 8:
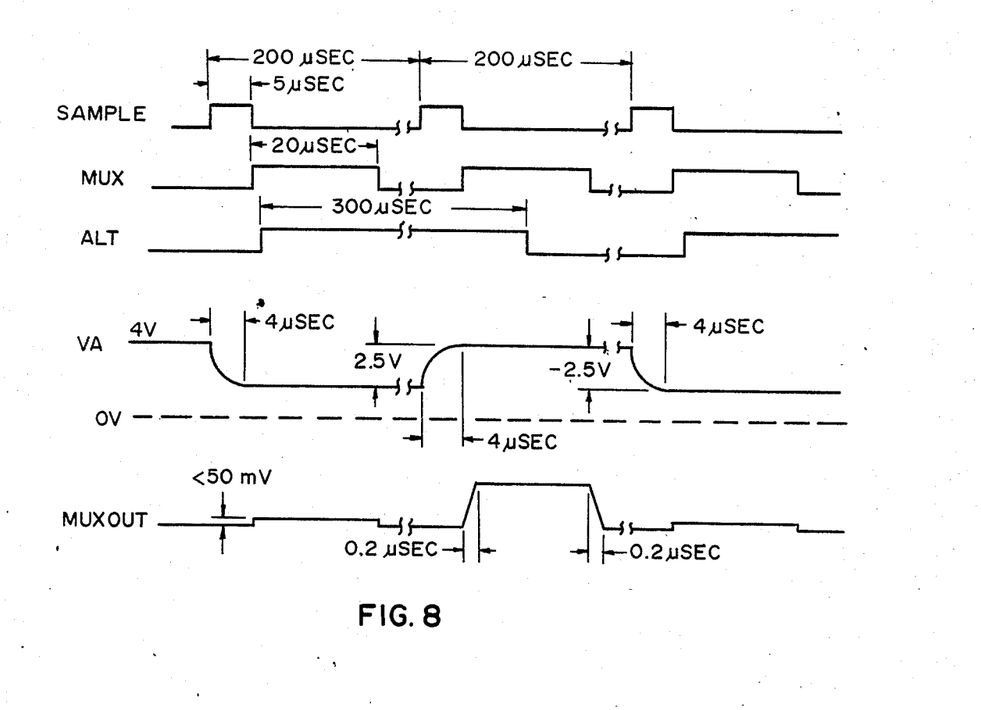
FIG. 8 is a timing diagram showing other electrical signals produced by the circuits of FIGS. 4 and 5.

In conjunction with FIGS. 7 and 8, the coordinate operation of the circuits of FIGS. 4, 5 and 6 can be readily understood in connection with operation of the system of FIG. 1. In such operation, the disk 13 is rotated and the transducer 19 reads the magnetically encoded information on the face of the disk, including the servo pulses P1–P3. Three representative servo pulses are shown in FIG. 7 and labelled A BRST, B BRST and C BRST to emphasize that the servo pulses P1–P3 produce high frequency sinusoidal signals of small amplitude. These A BRST, B BRST and C BRST signals comprise the ANALOG IN (+) input to the circuit of FIG. 4. The function of the circuit of FIG. 4 is to amplify the ANALOG IN (+) signals (i.e., the A BRST, B BRST and C BRST signals) and to rapidly produce on output signal PKAMP whose amplitude is representative of the received input signal. To accomplish the amplification function quickly without distortion (i.e., to be able to distinguish a small amplitude input signal such B BRST, from the zero signal level), the amplifier circuit 119 of FIG. 4 is operated in conjunction with the current mirror circuit 133 with both the amplifier circuit 119 and the current mirror circuit 13 depending upon the constant currents developed by the constant current source circuits 111 and 115.

The PKAMP signals thusly developed by the amplifier circuitry in FIG. 4 are transmitted to the circuit 171 of FIG. 6, which provides outputs on lines A, B and C, which lines are inputs to the circuit of FIG. 5. The circuits of FIG. 5 also receives synchronizing signals SA, SB and SC which correspond to the expected time of arrival of the signals A BRST, B BRST and C BRST. Such synchornization of the timing inputs SA, SB and SC is shown in FIG. 7. The coordinate operation of the circuit 171 of FIG. 6 and the circuit of FIG. 5 can be understood by considering, for example, transistor Q114 in FIG. 6. The transistor Q114 is shunted off by the transistor Q26 in FIG. 5 until the transistor Q26 is switched off by the gate input SA going positive through the inverter transistor Q25.

Also, during the time period determined by the pulse SA, the circuit of FIG. 5 provides an output voltage across the capacitor $C_A$ representative of the magnitude of the A BRST signal as amplified by the circuit of FIG. 4; likewise, during the time period determined by the pulse SB, the circuit of FIG. 5 provides an output voltage across the capacitor $C_B$ representative of the magnitude of the B BRST signal as amplified by the circuit of FIG. 4 and, during the period of the timing pulse SC, the output voltage across the capacitor $C_C$ is representative of the magnitude of the C BRST signal.

To provide the preceding functions, it is necessary to discharge or "reset" the capacitor 140 in FIG. 4 before each arrival of the A BRST, B BRST and C BRST signals. The discharging function is accomplished by the transistor Q15 in the circuit of FIG. 5. As previously mentioned, the voltage level of the base of the transistor Q15 is driven positive only during the times when the timing pulses SA, SB or SC are received at the bases of the respective transistors Q25, Q30 or Q35. During such time periods, the transistor Q15 operates to place the capacitor 140 at the potential corresponding to the signal ANALOG IN (+) line being zero; in other words, the transistor Q15 resets the capacitor 140 so that it is ready to be charged during amplification of the next non-zero input signal A BRST, B BRST or C BRST received on the ANALOG IN (+) line. FIG. 7 also shows the resetting signals, labelled RESET as synchronized with the timing pulses SA, SB and SC.

As described previously herein, the circuit of FIG. 5 functions to charge the respective capacitors $C_A$, $C_B$ and $C_C$ during the times that the timing pulses SA, SB and SC are received. Accordingly, the charge VA on the capacitor $C_A$ is directly proportional to the last received A BRST signal, the charge VB on capacitor $C_B$ is directly proportional to the last received B BRST signal, and the charge VC on the capacitor $C_C$ is directly proportional to the last received C BRST. A typical profile of the charge VA appearing across capacitor $C_A$ is shown in FIG. 8; the voltages across the capacitors $C_B$ and $C_C$ will have similar forms.

In FIG. 6, the circuits 179 and 183 function to provide a multiplexed output signal MUX OUT which is representative of the signals VA, VB and VC in serial sequence. An example of the relationship of the MUX OUT signal to the signal VA is shown in FIG. 8. Such MUX OUT signals are provided to a conventional analog-to-digital converter (not shown) which converts the MUX OUT signals to digital form for processing by the controller 25 of FIG. 1. Accordingly, the controller 25 effectively receives signals representative of the amplitudes of the A BRST, B BRST and C BRST signals read by the transducer 19. In turn, the controller 25 can compute a servo function based upon the amplitudes of the A BRST, B BRST and C BRST signals. The servo function is subsequently utilized to provide a torque control signal to the motor 23 which drives the read/write arm 21 or an equivalent mechanism for positioning the transducer 19.

In practicing the preferred embodiment, the ohmic values of the resistors utilized in the circuits of FIGS. 4-6 are as follows:

| R1 | 14,400 |
|---|---|
| R2-R6 | 450 |
| R7 and R8 | 600 |
| R9 | 200 |
| R10 | 7,200 |
| R11 | 3,600 |
| R12 | 7,200 |
| R13 | 3,600 |
| R14-R16 | 450 |
| R17 | 60,000 |
| R18 | 3,600 |
| R19 | 450 |
| R27 | 200 |
| R28 | 1,350 |
| R30 | 1,800 |
| R31-R33 | 3,600 |

| -continued | |
|---|---|
| R34-R40 | 14,400 |
| R41-R44 | 200 |
| R50, 53 and 56 | 3,600 |
| R51, 54 and 57 | 9,900 |
| R52, 55 and 58 | 60,000 |
| R59 | 9,900 |
| R60 | 60,000 |
| R65-R67 | 900 |
| R69 | 60,000 |
| R70-R75 | 1,800 |

Although the present invention has been decribed with particular reference to the illustrated preferred embodiment, it is to be understood that such disclosure is not to be interpreted as limiting. Various other alterations, modifications and embodiments will no doubt become apparent to those skilled in the art after having read the preceding diclosure. Accordingly, it is intended that the appended claims be interpreted as covering all such alterations, modifications and embodiments as fall within the true spirit and scope of the present invention.

I claim:

1. A system for controlling the movement of a read/write transducer associated with a magnetic disk drive system in which the read/write transducer is driven to move acorss the face of a rotating disk having equally spaced-apart servo sectors formed on the face of the disk, each of the servo sectors containing groups of marker pulses with the pulses arranged such that any group of three adjacent marker pulses spans two concentric tracks on the face of the disk and each of said pulses produces a high frequency sinusoidal signal when read by the read/write transducer, comprising:

a. amplifying means to rectify and amplify the high frequency sinusoidal signals used by said transducer;
   b. sampling means to sample and hold at least three values representative of the amplified high frequency sinusoidal signals;
   c. synchronizing means to synchronize the sample-and-hold means such that the first value sampled and held is representative of the amplitude of the first pulse read in a servo sector, the second value sampled and held is representative of the amplitude of the second pulse read in the servo sector, and the third value sampled and held is representative of the amplitude of the third pulse read in the servo sector;
   d. multiplexing means connected to the synchronizing means and to the sampling means to provide multiplexed signals sequentially representative of the first value sampled and held, followed by the second value sampled and held, followed by the third value sampled and held, and
   a current mirror circuit connected to the amplifying means to provide, at the output of the amplifying means, constant current equaling the current produced by said amplifying means when no high frequency sinusoidal signal is received by the amplifying means,
   the current mirror circuit including isolating means connected to the amplifying means to provide constant current thereto independent of changing current produced by the amplifying means,
   said isolating means comprising an isolating transistor connected in the common base configuration, with said isolating transistor having its emitter connected to receive current from said current mirror and its collector connected to the amplifying means.

2. The system according to claim 1 wherein, a constant current source is connected to provide current to the amplifying means and to said current mirror circuit.

3. The system according to claim 1 wherein said current mirroring circuit includes, current mirroring transistors connected to said emitter of said isolating transistor, and means to minimize the collector-to-base capacitances of said current mirroring transistors.

4. The system according to claim 3 wherein, at least one of said current mirroring transistors comprises a transistor having its collector connected to the emitter of said isolating transistor and its emitter connected to receive current which is a fixed proportion of the current provided by said constant current source.

5. The system according to claim 4 wherein, said means to minimize the collector-to-base capacitance of said current mirroring transistors includes at least one transistor connected in the common-collector configuration with its emitter connected to the base of at least one current mirroring transistor means and its base connected to receive current from said constant current source.

6. A system according to claim 1 wherein, the amplifying means provides a charge on an output capacitor, where the magnitude of the charge on said output capacitor is representative of the amplified value of said high frequency sinusoidal signals.

7. A system according to claim 6 wherein, the samplying means includes discharging means connected to selectively discharge said output capacitor.

8. A system according to claim 7 wherein, said discharging means is connected to the synchronizing means, and provides discharge of said output capacitor following the expected time of arrival of each of said marker pulses.

9. A method for controlling movement of a read/write transducer associated with a magnetic disk drive system in which the read/write arm is driven to move across the face of a rotating disk comprising:
 a. forming equally spaced-apart servo sectors formed on the face of the disk, each of the servo sectors containing marker pulses arranged in groups such that any group of three adjacent marker pulses spans two tracks, centerline-to-centerline, on the face of the disk;
 b. amplifying and rectifying the high frequency sinusoidal signals read by said transducers in an amplifying circuit;
 c. sampling and holding at least three values representative of the amplified high frequency sinusoidal signals;
 d. synchronizing the sample-and-hold means such that the first value sampled and held is representative of the amplitude of the first pulse read in a servo sector, the second value sampled and held is representative of the amplitude of the second read in the servo sector, and the third value sampled and held is representative of the amplitude of the third pulse read in the servo sector;
 e. multiplexing the sampled and held values to provide multiplexed signals sequentially representative of the first value sampled and held, followed by the second value sampled and held, followed by the third value sampled and held,
 mirroring the output current of the amplifying means by means of current mirror circuitry to provide, at the output of the amplifying means, constant current equaling the current produced by said amplifying means when no high frequency sinusoidal signal is received by the amplifying means, and
 isolating the current mirror circuits from the amplifying circuit to provide constant current to the amplifying circuit independent of changing current produced by the amplifying means,
 wherein said isolating step is accomplished by a transistor connected in the common base configuration, with said transistor having its emitter connected to receive current from said current mirror circuitry and its collector connected to the amplifying circuit.

10. The method according to claim 9 including the step of:
 providing constant current source to the amplifying means and to said current mirror circuit.

11. A system according to claim 9 including the step of:
 utilizing the amplifying means to provide a charge on an output capacitor, where the magnitude of the charge on said output capacitor is representative of the amplified value of said high frequency sinusoidal signals.

12. A system according to claim 11 including the step of:
 utilizing the sampling means to selectively discharge said output capacitors following the expected time of arrival of each of said marker pulses.

13. A system for controlling the movement of a read/write transducer associated with a magnetic disk drive system in which the read/write transducer is driven to move across the face of a rotating disk having equally spaced-apart servo sectors formed on the face of the disk, each of the servo sectors containing groups of marker pulses and each of said pulses prodicing a high frequency sinusoidal signal when read by the read/write transducer, comprising:
 amplifying means to rectify and amplify the high frequency sinusoidal signals read by said transducer;
 sampling means to sample and hold a plurality of values representative of the amplified high frequency sinusoidal signals;
 synchronizing means to synchronize the sample-and-hold means such that the sequence of values sampled and held is representative of the amplitude of the sequence of pulses read in the servo sector;
 multiplexing means connected to the synchronizing means and to the sampling means to provide multiplexed signals sequentially representative of the sequence of values sampled and held, and
 a current mirror circuit connected to the amplifying means to provide, at the output of the amplifying means, constant current equaling the current produced by said amplifying means when no high frequency sinusoidal signal is received by the amplifying means,
 the current mirror circuit including isolating means connected to the amplifying means to provide constant current thereto independent of changing current produced by the amplifying means, said isolating means comprising an isolating transistor connected in the common base configuration, with said isolating transistor having its emitter connected to receive current from said current mirror and its collector connected to the amplifying means.

14. The system according to claim 13 wherein, a constant current source is connected to provide current to the amplifying means and to said current mirror circuit.

15. The system according to claim 13 wherein said current mirror circuit includes, current mirroring transistors connected to said emitter of said isolating transistor, and means to minimize the collector-to-base capacitances of said current mirroring transistors.

16. The system according to claim 15 wherein at least one of said current mirroring transistors comprises a transistor having its collector to the emitter of said isolating transistor and its eitter connected to receive current which is a fixed proportion of the current provided by said constant current source.

17. The system according to claim 15 wherein, said means to minimize the collector-to-base capacitance of said current mirroring transistors includes at least one transistor connected in the common-collector configuration with its emitter connected to the base of at least one current mirroring transistor means and its base connected to receive current from said constant current source.

18. A system according to claim 13 wherein, the amplifying means provides a charge on an output capacitor, where the magnitude of the charge on said output capacitor is representative of the amplified value of said high frequency sinusoidal signals.

19. A system according to claim 18 wherein, the sampling means includes discharging means connected to selectively discharge said output capacitor.

20. A system according to claim 19 wherein, said discharging means is connected to the synchronizing means, and provides discharge of said output capacitor following the expected time of arrival of each of said marker pulses.

21. A method for controlling movement of a read/write transducer associated with a magnetic disk drive system in which the read/write arm is driven to move across the face of a rotating disk comprising:

forming equally spaced-apart servo sectors on the face of the disk, each of the servo sectors containing marker pulses arranged in groups;

amplifying and rectifying the high frequency sinusoidal signals read by said transducers in an amplifying circuit;

sampling and holding a plurality of values representative of the amplified high frequence sinusoidal signals;

synchronizing the sample-and-hold means such that the sequence of values sampled and held is representative of the amplifude of the sequence of pulses read in the servo sector;

multiplexing the sampled and held values to provide multiplexed signals sequentially representative of the sequence of values sampled and held;

mirroring the output current of the amplifying means by means of a current mirror circuit to provide, at the output of the amplifying means, constant current equaling the current produced by said amplifying means when no high frequency sinusoidal signal is received by the amplifying means, and isolating the current mirror circuit from the amplifying circuit to provide constant current to the amplifying circuit independent of changing current produced by the amplifying means, wherein said isolating step is accomplished by a transistor connected in the common base configuration, with said transistor having its emitter connected to receive current from said current mirror circuit and its collector connected to the amplifying circuit.

22. The method according to claim 21 including the step of:

providing constant current source to the amplifying means and to said current mirror circuit.

23. A system according to claim 21 including the step of:

utilizing the amplifying means to provide a charge on an output capacitor, where the magnitude of the charge on said output capacitor is representative of the amplified value of said high frequence sinusoidal signals.

24. A system according to cliam 23 including the step of:

utilizing the sampling means to selectively discharge said output capacitors following the expected time of arrival of each of said marker pulses.

* * * * *